United States Patent
Mafi et al.

(10) Patent No.: US 7,357,219 B2
(45) Date of Patent: Apr. 15, 2008

(54) SOUND ATTENUATING COVER FOR DOMESTIC AIR CONDITIONER COMPRESSORS

(76) Inventors: Masoud Mafi, 30 Harrison Garden Blvd. #2302, Toronto, Ontario (CA) M2N 7A9; Fabian Bortolotto, 60 Kennard Street, Stoney Creek, Ontario (CA) L8J 2C6

( * ) Notice: Subject to any disclaimer, the term of this patent is extended or adjusted under 35 U.S.C. 154(b) by 46 days.

(21) Appl. No.: 10/895,033

(22) Filed: Jul. 21, 2004

(65) Prior Publication Data

US 2005/0056481 A1   Mar. 17, 2005

Related U.S. Application Data

(60) Provisional application No. 60/488,448, filed on Jul. 21, 2003.

(51) Int. Cl.
*H02K 5/24* (2006.01)

(52) U.S. Cl. .................. 181/202; 171/200; 171/201; 171/205; 171/290

(58) Field of Classification Search ............... 181/202, 181/200, 201, 205, 290, 287, 294, 225, 224; 415/119; 62/296, 259; 417/312, 403
See application file for complete search history.

(56) References Cited

U.S. PATENT DOCUMENTS 4,591,318 A * 5/1986 Elson ................... 417/312
4,991,406 A * 2/1991 Fujii et al. .................. 62/296
5,274,200 A   12/1993 Das et al.
5,497,819 A * 3/1996 Chiang ..................... 150/166
5,965,851 A   10/1999 Herreman et al.
6,062,033 A   5/2000 Choi
6,722,466 B1  4/2004 Tong et al.
6,866,474 B2 * 3/2005 Uselton ................. 415/121.2
7,055,582 B2 * 6/2006 Erisgen ..................... 165/122
2003/0116576 A1 * 6/2003 Lang-Boecker ............ 220/738
2003/0182954 A1  10/2003 Parker et al.

FOREIGN PATENT DOCUMENTS

JP       6-185462    *  7/1994

* cited by examiner

*Primary Examiner*—Lincoln Donovan
*Assistant Examiner*—Forrest Phillips
(74) *Attorney, Agent, or Firm*—Gowan Intellectual Property

(57) ABSTRACT

A sound attenuating cover is adapted for intimate fitment to a compressor of a domestic air conditioner, and comprises an outer sleeve member and a generally circular top member which is releasably secured to the outer sleeve member. Hook and loop fasteners secure a first end of the outer sleeve member to a portion of the outer periphery of the sleeve member. When the closure member secures the top member to the outer sleeve member, and the hook and loop fasteners are secured, a cylindrical cover having a closed top end is formed having a diameter adapted for intimate fitment to a compressor of a domestic air conditioner. Each of the outer sleeve member and the circular top member comprises inner and outer cover sheeting material, and at least one layer of sound attenuating material which is typically glass fiber together with barium loaded vinyl.

14 Claims, 4 Drawing Sheets

SOUND ATTENUATING COVER FOR DOMESTIC AIR CONDITIONER COMPRESSORS

FIELD OF THE INVENTION

This invention relates to domestic air conditioners, and particularly the invention relates to a sound attenuating cover which is intended to be fitted over the compressor of a domestic air conditioner. The invention provides an easily installed sound attenuating cover which will at least halve the sound level of a compressor and the attendant, refrigeration condensor coil structure associated therewith—that is, the sound level will at least be reduced by at least 3 db—and typically by up to 8 to 12 db. Moreover, the sound attenuating cover for domestic air conditioner compressors may be easily fitted in the field, thereby making it possible for retrofit to existing domestic air conditioning installations

BACKGROUND OF THE INVENTION

The matter of excessive noise emanating from domestic air conditioning installations, and particularly from the refrigeration condensor coil assembly therefor, has long been a matter of concern and annoyance. Typically, a domestic air conditioner installation comprises a plenum-mounted evaporator coil mounted to provide cooling effect to air blowing through the plenum to be then distributed to a room or rooms that are intended to be cooled. That evaporator coil is, in turn, connected to an externally mounted refrigeration condensor coil structure by refrigerant piping so that the refrigerant is fed back to a compressor which is, in turn, associated with a plurality of cooling fins, whereby the well-known refrigeration cycle continues and cool refrigerant is fed back to the plenum-mounted evaporator coil. Within the externally mounted refrigeration condensor coil structure there is mounted a fan, whose purpose is to induce airflow over the cooling fins.

Of course, there are a number of sources of noise during the operation of an externally refrigeration condensor coil structure. Those sources of noise include not only the sound of air flowing over and past the cooling fins, but particularly the sound of the compressor itself as it is operating, and also to some extent the sound of the fan as it pulls air through the refrigeration condensor coil structure and expels it upwardly and away from the refrigeration condensor coil structure. The present inventors have noted, however, that the sound of the fan can be exacerbated if there is not a clear and unhindered or unencumbered air flow path within the air of the heat ginger structure towards the fan. On the other hand, typically the only structural member which is found within the interior of a refrigeration condensor coil structure is, indeed, the compressor and the associated refrigerant piping and electrical wiring connected to it.

This, in turn, has led to the unexpected discovery that by aerodynamically streamlining the compressor, as well as by surrounding it with a sound attenuating cover, an enhanced sound attenuation or noise abatement can be achieved beyond that which is the result simply of the utilization of the sound attenuating cover.

Accordingly, the inventors herein provide a sound attenuating cover which may be intimately fitted to the compressor of a domestic air conditioner quickly and efficiently. Moreover, sound attenuating covers for domestic air conditioners in keeping with the present invention may be easily shipped in a collapsed or unassembled condition, for easy field installation. This is achieved by providing effectively a two-piece structure comprising a top cover member and an outer sleeve member which, when assembled, assumes a closed cylindrical structure appearance having a slightly adjustable diameter, and which can be secured in place and intimately fitted to the compressor.

It is recognized and understood, of course, that the diameter and height of compressors will vary from manufacturer to manufacture, and particularly depending on the rating of the compressor. For example, a small compressor rated at 24,000 BTU will usually be smaller both in diameter and height than a larger compressor rated at, say, 60,000 BTU. However, those details are of little consequence to the present invention, and are merely a matter of dimension and scaling to meet the specific requirements of each manufacture for specific compressors. That is to say, different sizes and designs of compressors merely require different cutting patterns and templates for their manufacture.

The present inventors also provide a structure which may utilize varying sound attenuating materials, depending to some extent on the size and rating of the compressor to which the sound attenuating cover, and depending also on the available space within specific refrigeration condensor coil structures. Some manufacturers will provide a smaller refrigeration condensor coil structure that may be cantilever mounted to a wall and which may therefore have a smaller dimension and weight than a similar rated condenser coil structure which is intended to be mounted on such as a concrete pad.

DESCRIPTION OF THE PRIOR ART

Several prior art patent publications describe various sound attenuating structures which, however, either provide very complicated and expensive structures, or in any event fail to recognize some of the inherent causes of noise in domestic air conditioners. The following patent publications are known to the inventors.

Das et al U.S. Pat. No. 5,274,200 teaches a sound attenuating enclosure for compressors which, however, provides a plurality of flat panels that may be mounted around a compressor. Because of the nature of the structure, it would be very difficult to mount in the field. Moreover, the structure comprises not only sound attenuating materials but also sound reflecting materials, which in some circumstances could lead to booming or echoing, and thereby even greater sound levels than of an unenclosed compressor.

Herreman et al U.S. Pat. No. 5,965,851 teaches an insulated apparatus where an acoustic insulation system is provided over a machine which may generate noise at a peak sound frequency. A two-part stratum is provided having a porous sound absorbing media layer and also a sound reflecting barrier layer, the entire structure being effectively "tuned" to the specific peak sound frequency.

Choi U.S. Pat. No. 6,062,033 is directed particularly to an outdoor air conditioner where a noise reducing structure is provided for the compressor in the form of a bottom sheet attached tightly to the lower surface of the compressor and a dome-shaped top sheet which encloses asides and top of the compressor. However, once again the top sheet comprises both a noise-reflecting material and a noise-absorbing material. The structure is such that it is formed in two sections that are joined together at a vertical parting line, and is thus such that it cannot easily be installed in the field.

Tong et al U.S. Pat. No. 6,722,466 is stated cited because it provides an acoustic blanket that comprises a plurality of flexible panels where each panel includes at least one layer of a fiber glass material together with an outer casing of a chemically resistant material. Attachment means are provided for connecting adjacent panels one to the other. However, it is recognized that the teachings of this patent are particularly directed to large industrial machines, and otherwise have little relevance to domestic air conditioner installations.

Parker et al. U.S. patent Application Publication 2003/0182954 relates to a high-efficiency air conditioner condensor fan. This publication at least recognizes that fans, themselves, may beta source of noise, and provides for a noise reduction configuration which includes asymmetrically mounted blades about the hub.

SUMMARY OF THE INVENTION

In accordance with one aspect of the present invention, there is provided a sound attenuating cover which is adapted for intimate fitment to a compressor of a domestic air conditioner. The sound attenuating cover generally comprises an outer sleeve member and a generally circular top member.

In a first preferred embodiment of the present invention, the generally circular top member is hingedly secured to the outer sleeve member at a portion of the periphery of the top member.

A closure member is provided for releasably the securing the remainder of the periphery of the top member to the outer surface of the outer sleeve member.

However, in a more general preferred embodiment of the present invention, it is possible that the generally circular top member may be adapted to be releasably secured to and removable from the outer sleeve member by a closure member.

In either event, hook and loop fasteners are provided for securing a first end of the outer sleeve member to a portion of the outer periphery of the outer sleeve member near a second end thereof.

Thus, when the closure member secures the top member to the outer sleeve member, and the hook and loop fasteners are secured, there is formed a cylindrical cover having a closed top end and having a diameter which is adapted for intimate fitment to a compressor of a domestic air conditioner.

Each of the outer sleeve member and the circular top member comprises an inner cover sheeting material and an outer cover sheeting material, and at least one layer of sound attenuating material therebetween.

In any embodiment of the present invention, the outer sleeve member will have cutout portions formed therein so as to accommodate electrical and refrigerant piping connections to a compressor when the sound attenuating cover is fitted thereover.

Also, the inner and outer cover sheet in materials may be chosen from the group which consists of vinyl, PVC, heat resistant PVC, glass fiber sheeting, canvas, and mixtures and combinations thereof.

In any embodiment of the present invention, the at least one layer of sound attenuating material may be chosen from the group which consists of vinyl-based sheeting, vinyl-based foam, barium loaded vinyl, glass fiber sheeting, glass fiber matting, and mixtures and combinations thereof.

Typically, there will at least be a layer of glass fiber matting. If so, then typically the outer edges of each of the outer sleeve member and the circular top member will have been sealed by a process chosen from the group consisting of heat sealing, heat welding, stitching, gluing, embossing, and mixtures and combinations thereof.

In general, at least the circular top member may have at least one hole formed in the inner cover sheeting material so as to permit entrained air in the glass fiber matting to be expelled therefrom for purposes of packaging the sound attenuating cover. The hole also permits air to re-enter the glass fiber matting upon assembly of the sound attenuating cover for fitment to a compressor of the domestic air conditioner.

In general, the closure member which secures the circular top member to the outer sleeve member may be a zipper, a bead and channel fastener, or a hook and loop fastener.

So as to increase the aerodynamic streamlining of the sound attenuating cover when it is fitted over the compressor of a domestic air conditioner, the profile of the circular top member above the closure member may include an inwardly and upwardly directed tapered side, so as to thereby provide a truncated conical configuration.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which.

DETAILED DESCRIPTION OF THE PREFERRED EMBODIMENTS

The novel features which are believed to be characteristic of the present invention, as to its structure, organization, use and method of operation, together with further objectives and advantages thereof, will be better understood from the following discussion.

Figure 1:
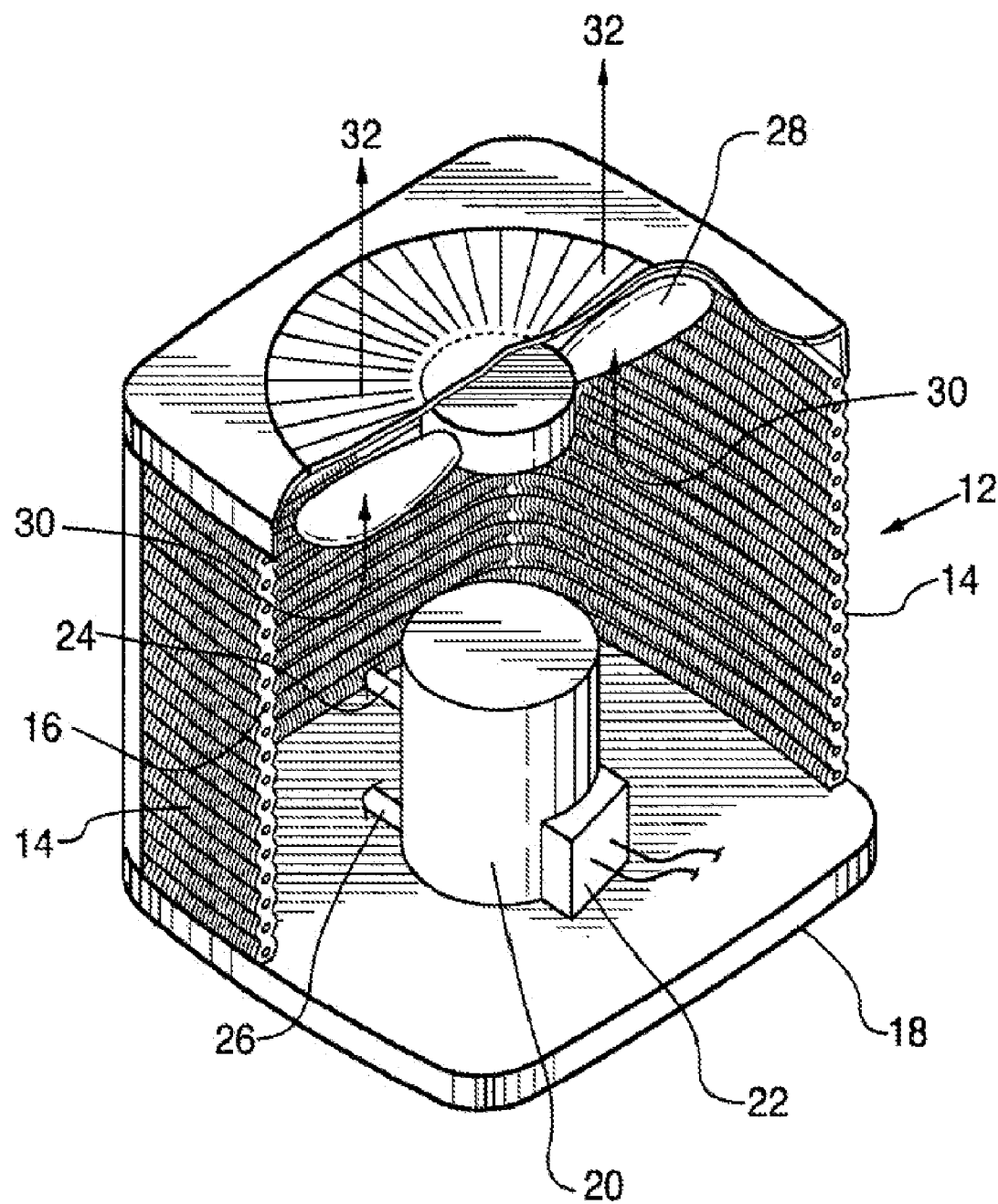
FIG. 1 is a view of a typical structure of a refrigeration condensor coil structure of a domestic air conditioner installation, partially broken away for purposes of discussion of the present invention in its context.

Referring first to FIG. 1, a typical installation of a domestic air conditioner is shown. That installation comprises a refrigeration condensor coil structure 12, within which are found a plurality of cooling fins 14 together with the associated refrigerant piping 16. Mounted on the bottom 18 of the structure 12 is a compressor 20. Associated with the compressor 20 is an electrical control box 22 and associated wiring therefor, and the appropriate refrigerant tubing or conduit 24, 26. At the top of the structure 12 there is mounted a fan 28.

It will be understood that the above the description is intended solely for purposes of illustration, and is not intended to be representative of any specific domestic air conditioner installation. Neither does the present discussion intend to teach the operation of a domestic air conditioner installation, except as that operation is affected by the presence of the sound attenuating cover of the present invention when it is placed over a compressor 20.

When the fan 28 operates, air is drawn into the structure 12 in the manner shown by arrows 30, and exits the structure 12 past the fan 28 in the manner shown by arrows 32. Air flow over the cooling fins 14 effects heat exchange in the well known manner, thereby permitting the refrigeration cycle of the compressor 20 to operate. However, the present inventors have noted that if there is an impedance to the air flow shown particularly by arrows 30, so that the volume for air flow within the structure 12 is significantly reduced or cluttered, then operation of the fan 28 is "choked" or is otherwise effected in such a manner that the fan becomes noisier and the sound level emanating from the fan 28 is higher. However, the present inventors have also quite unexpectedly noted that if a smooth, aerodynamically streamlined cover is placed over the compressor 20, then there is no increase in the level of sound emanating from the fan 28; and at the same time, if the cover placed over the compressor 20 has sound attenuating properties of its own, then the sound level emanating from the domestic air conditioner refrigeration condensor coil structure 12 may be reduced by as much as 8 db to 12 db.

The structure of a sound attenuating cover 40 in keeping with present invention is now described with reference to FIGS. 2 to 5.

Figure 2:
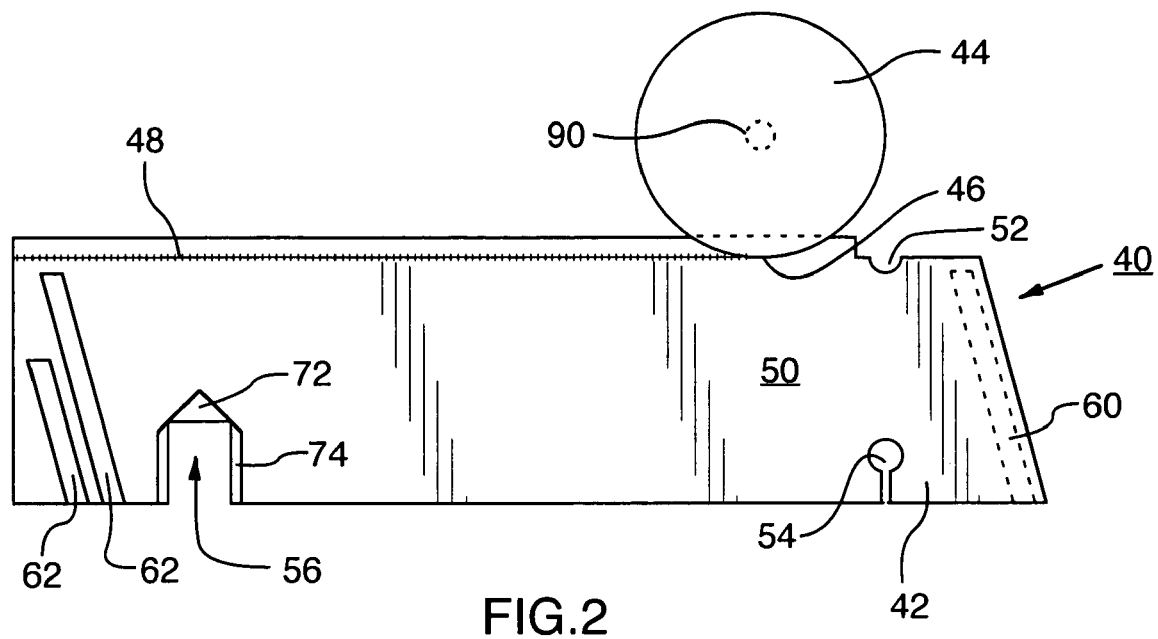
FIG. 2 is a plan view of a typical preferred embodiment of the present invention prior to its assembly for installation over the compressor of a domestic air conditioner.

FIG. 2 illustrates a typical preferred embodiment of the sound attenuating cover 40, having two principal components or members, namely an outer sleeve member shown generally at 42 and a generally circular top member shown generally at 44. In a first embodiment of the sound attenuating cover 40, the generally circular top member 44 may be hingedly secured to the outer sleeve member 42 at a portion of the periphery of the top member shown at 46. However, as will be clear from the following discussion, it is possible that the top member 44 may, in a second preferred embodiment, be separated completely from the outer sleeve member 42. It will be understood, of course, that the outer sleeve member 43 and the top member 44 are somewhat flexible in nature, and in any event they are not stiff.

Figure 3:
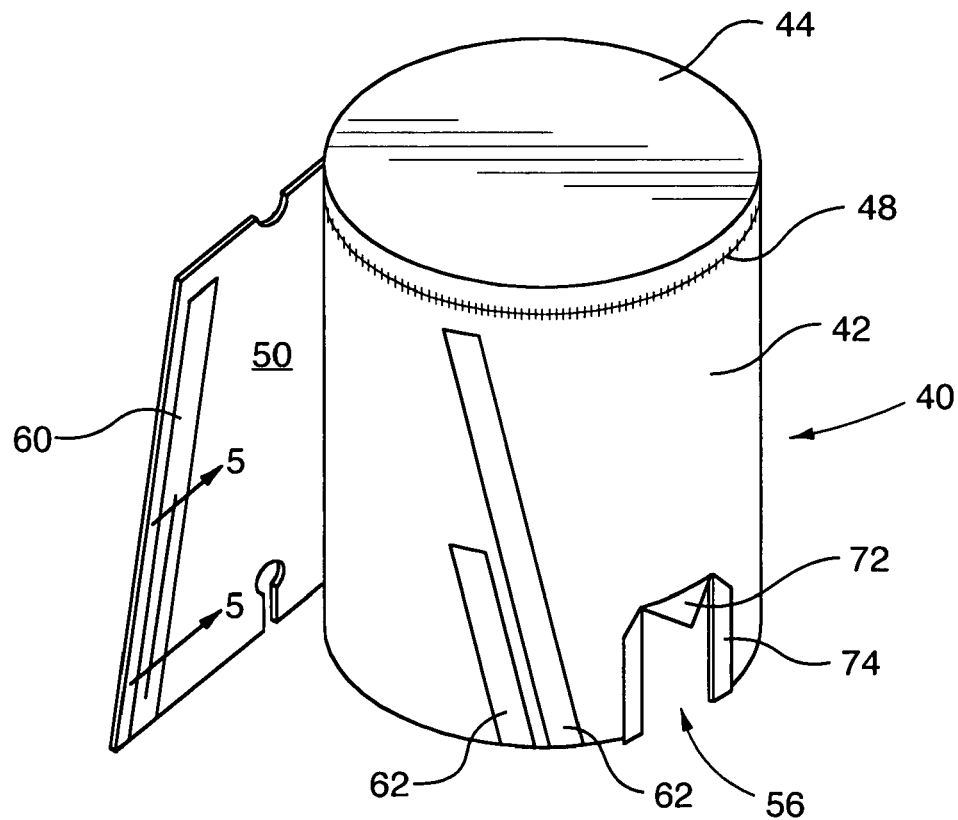
FIG. 3 is a view of a partially assembled sound attenuating cover in keeping with the present invention, prior to its fitment to a compressor of a domestic air conditioner.

In any embodiment of the sound attenuating cover, the outer sleeve member 42 and the generally circular top member 44 may be secured one to the other by a closure member 48. Typically, the closure member 48 is a zipper, but it may also be a bead and channel fastener, or it may be a hook and loop fastener, As will be seen particularly with reference to FIGS. 3 and 4, when the outer sleeve member 42 and the top member 44 are secured together by the closure member 48, a cylindrical structure begins to take form as shown in FIG. 3. It will be seen in FIG. 2 that a portion 50 of the outer sleeve member 42 extends past the closure member 48, so as to form a flap. It will also be understood that cutouts 52 and 54 will accommodate refrigerant tubing 24 and 26, respectively; and it will be seen that cutout 56 will accommodate an electrical terminal box 22 mounted to the compressor 20. For purposes of intimate fitment of the sound attenuating cover 40 to the compressor 20, hook and loop fasteners 60, 62 are provided. Typically, the hook portion of the hook and loop fasteners is provided at 62, with the loop portion being provided at 60.

Figure 4:
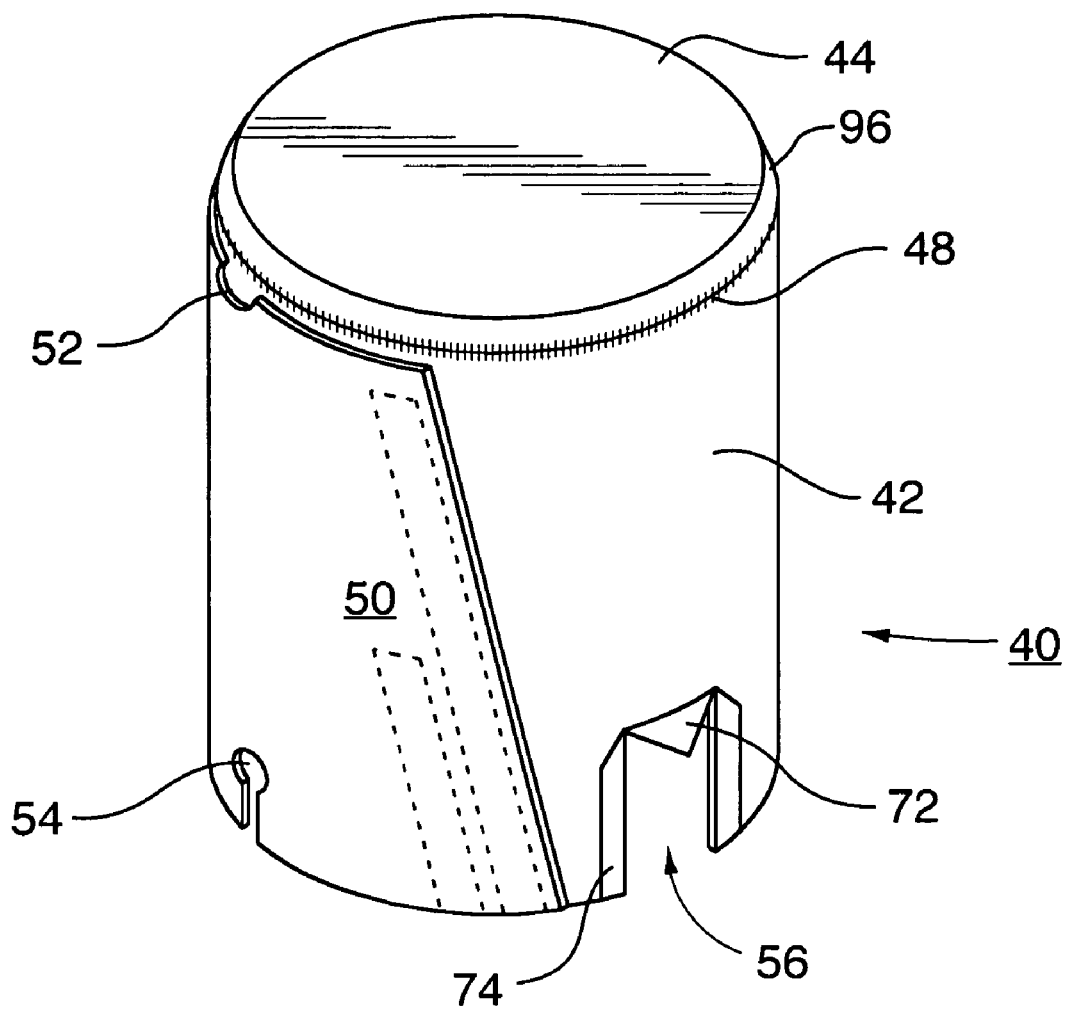
FIG. 4 is a view similar to FIG. 3, but showing an alternative embodiment of an assembled sound attenuating cover as it will appear when fitted over a compressor of a domestic air conditioner.

It will be understood from an inspection of FIGS. 3 and 4 that attachment of the hook and loop fastener 60, 62 may be slightly adjustable so as to accommodates slightly different sizes of compressor. For example, compressors rated at 24,000 BTU or 30,000 BTU may be nearly the same size, with just slightly different diameters, but not of sufficiently different sizes to warrant new cutting patterns for the manufacture of a different sound attenuating cover having a different part number, a different SKU, and so on.

It will also be understood that flaps 72, 74 assist in intimate fitment of the sound attenuating cover to the compressor 20 and its associated controls.

Figure 5:
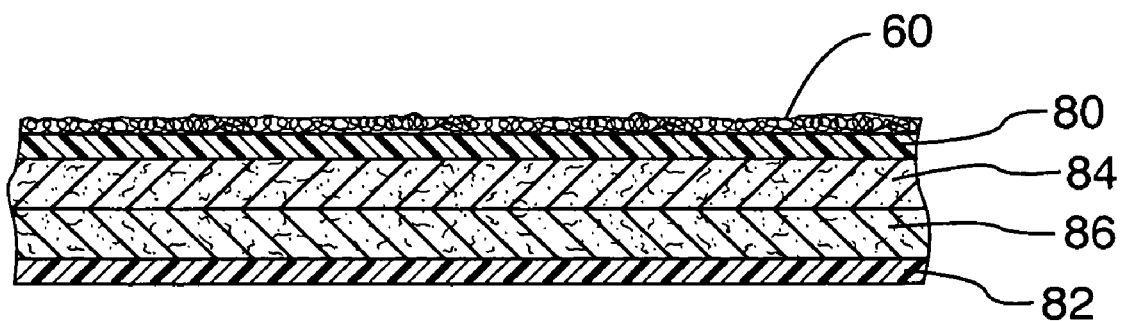
FIG. 5 is a cross section taken along lines 5-5 in FIG. 3.

Referring to FIG. 5 a typical cross-section of the outer sleeve member 42 is shown. It will be understood that a similar or identical cross-section will also be true for the generally circular top member 44. The typical structure is a multilayer structure, comprising inner and outer cover sheeting materials 80, 82; and at feast one layer, typically at least two layers, of sound attenuating material, shown at 84 and 86. The material of the inner or outer cover sheeting materials 80, 82 is typically heat resistant PVC, but it may also be vinyl, PVC, glass, fiber sheeting, canvas, or mixtures or combinations thereof. Typically, at least the material of the outer sheeting material 82 as a smooth or relatively smooth surface, so as to assist in aerodynamic streamlining of the installed sound attenuating cover over a compressor 20, and thereby so as to preclude choking of the fan which will then run smoother and quieter.

Typically, at least one layer 84 of sound attenuating material is glass fiber matting, but it might also be glass fiber sheeting or vinyl-based foam. The other layer 86 of sound attenuating material may also be glass fiber sheeting or vinyl-based sheeting, but is typically barium loaded vinyl having a loading of typically from 0.5 to 1.2 pounds per square foot.

As noted, typically there is at least one layer of sound attenuating material including glass fiber matting. If so, then it will be understood that air will be entrained within the glass fiber matting, which increases its volume. It will also be understood that the glass fiber matting may be compressed and the entrained air within it may be expelled. This feature is helpful to reduce the volume of the sound attenuating cover when it is folded for packing and shipping purposes. To that end, therefor, a hole 90 may be provided in the generally circular top member 44, and a similar hole or holes (not shown) may be provided in the outer sleeve member 42.

It will also be understood, of course, that typically the entire periphery of each of the outer sleeve member 42 and the circular top member 44 are otherwise sealed, such as by heat sealing, heat welding, stitching, gluing, embossing, and mixtures and combinations thereof.

It will also be noted in FIG. 4 that the generally circular top member 44 may be configured as at 96 to have an inwardly and upwardly directed tapered side extending inwardly and upwardly from the closure member 48. This gives the generally circular top member 44 a truncated conical configuration as can be determined from FIG. 4.

it has been noted that sound attenuating covers of the present invention, which are intended for intimate fitment to compressors of domestic air conditioners, may be installed in the field. That is, they may be retrofitted to existing domestic air conditioner installations. The structure of the present invention permits such installation in an easy and efficient manner. The sound attenuating cover is initially assembled to a condition such as that shown in FIG. 3, and is then slipped down over a compressor 20 and the flap 50 is secured in place by the hook and loop fasteners 60, 62. In many instances there is limited space between the compressor 20 and the cooling fins 14, such that the hands of a workman may be accommodated but there may be very little room for manipulation. Thus, the present structure provides for easy installation, unlike any of the known prior art sound attenuating covers which are intended for installation over the compressor of a domestic air conditioner. Indeed, as previously noted, some of the prior art structures may not be capable of being mounted or installed in the field.

Several representative examples of installations of sound attenuating covers in keeping with the present invention are now described. In one installation, being that of a typical domestic air conditioner having a rating of 24,000 BTU, installation of the sound attenuating cover resulted in reduction of the noise level emanating from the air conditioner by 8 db. In another installation, where the air conditioner has a rating of 36,000 BTU, the noise level was attenuated by 7 db.

Figure 6:
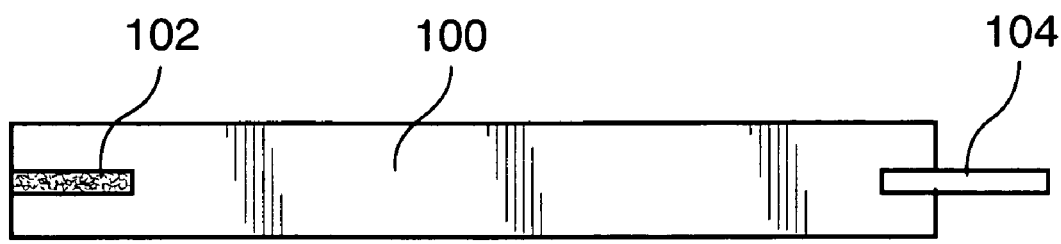
FIG. 6 is a plan view of an auxiliary extension sleeve that may sometimes be required.
Figure 7:
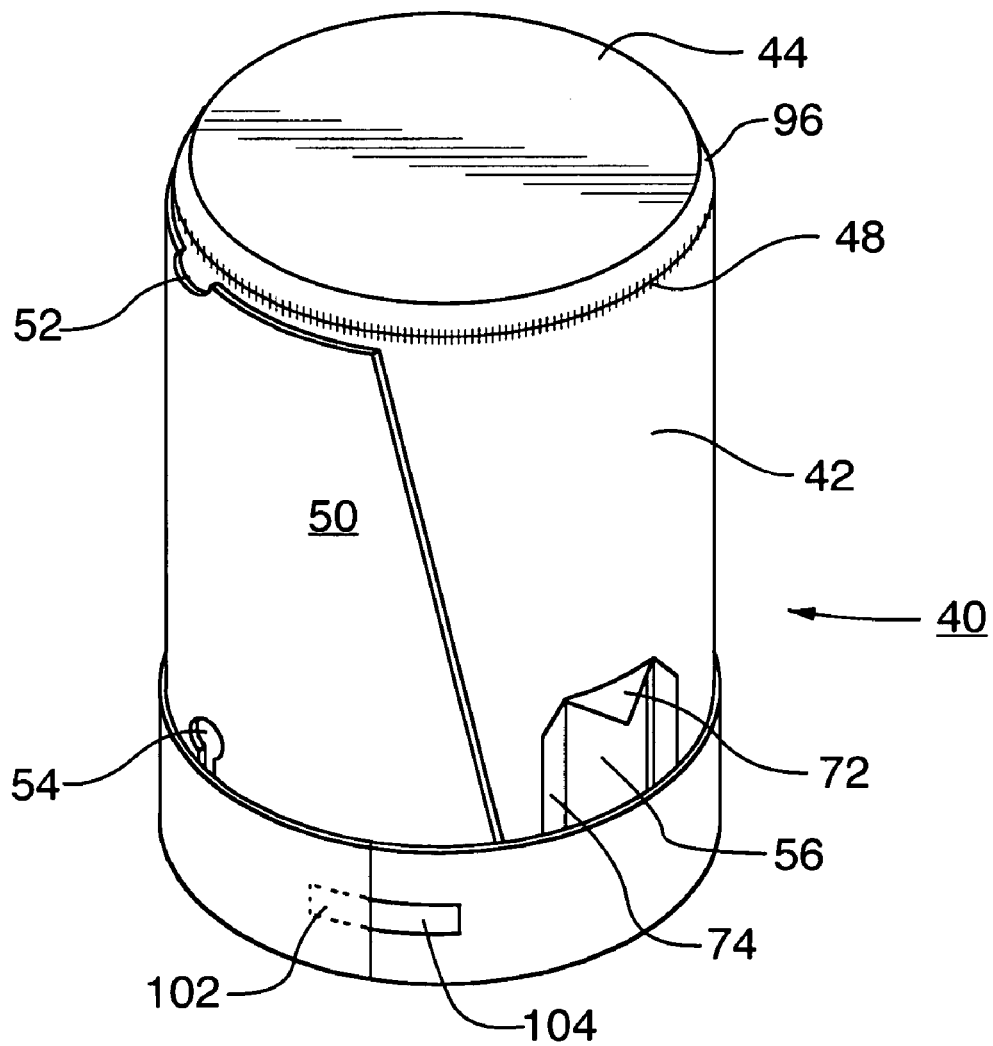
FIG. 7 is a view similar to FIG. 4 showing use of the auxiliary extension sleeve when fitted over a compressor of a domestic air conditioner together with an assembled sound attenuating cover.

Referring now to FIGS. 6 and 7, the use of an auxiliary extension sleeve 100 is shown. The construction of the auxiliary sleeve 100 is essentially the same as or identical to the construction of the sound attenuating cover 40 as it has been described above the; and likewise, the cross-section of the auxiliary extension sleeve 100 is essentially the same as that which is illustrated in FIG. 5. The length of the auxiliary extension sleeve is such that it will wrap around a compressor including the additional thickness of the compressor having a sound attenuating cover 40 installed thereover. The auxiliary extension sleeve 100 is secured in place by use of hook and loop fasteners 102, 104.

It will be evident that use of the auxiliary extension sleeve 100 may be required in circumstances where the height of the compressor, but not the diameter thereof, is greater than otherwise they used compressors for which sound attenuating covers in keeping with the present invention are manufactured. It is also useful in some circumstances where the placement of the refrigeration piping and/or the electrical connection to the compressor is not standardized. Thus, use of the auxiliary extension sleeve 100 provides for additional sound attenuation particularly in the circumstances of use of a non-standard compressor.

Other modifications and alterations may be used in the design and manufacture of the apparatus of the present invention without departing from the spirit and scope of the accompanying claims.

Throughout this specification and he claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

Moreover, the word "generally" when used with an adjective or adverb is intended to enhance the scope of the particular characteristic; e.g., generally circular is intended to mean circular, nearly circular and/or exhibiting characteristics associated with circularity of an element.

The invention claimed is:

1. A sound attenuating cover adapted for aerodynamically streamlined and intimate fitment to a compressor in the refrigeration condensor coil structure of a domestic air conditioner, which refrigeration condensor coil structure comprises an outer cooling coil shell forming a vertically orientated open area, a compressor assembly located at a bottom end of said open area and extending vertically upward into said opening, and a rotating fan at a top end of said open area to create an air flow within said structure in which air moves into said open area through said cooling coil shell, and moves vertically upwards past said compressor and through said fan, said cover comprising: an outer sleeve member and a generally circular top member hingedly secured to said outer sleeve member at a portion of the periphery of said top member; a closure member for releasably securing the remainder of the periphery of said top member to the outer surface of said outer sleeve member; and hook and loop fasteners for securing a first end of said outer sleeve member to a portion of the outer periphery of said outer sleeve member near a second end thereof; whereby, when said closure member secures said top member to said outer sleeve member, and said hook and loop fasteners are secured, a cylindrical cover having a closed top end is formed having a diameter adapted for intimate fitment to a compressor of a domestic air conditioner; wherein the profile of said circular top member includes an inwardly and upwardly directed tapered side from said closure member, so as to provide an exterior truncated conical configuration thereof, and wherein each of said outer sleeve member and said circular top member comprises an inner cover sheeting material and an outer cover sheeting material, and at least one layer of sound attenuating material therebetween, and wherein at least part of said air flow enters said refrigeration condensor coil structure at the side of said compressor cover, and moves vertically upwards past said inwardly and upwardly directed tapered side of said closure member.

2. The sound attenuating cover of claim 1, wherein said outer sleeve member has cutout portions formed therein so as to accommodate electrical and refrigerant piping connections to a compressor when said sound attenuating cover is fitted thereover.

3. The sound attenuating cover of claim 1, wherein said inner and outer cover sheeting materials are each chosen from the group consisting of vinyl, PVC, heat resistant PVC, glass fiber sheeting, canvas, and mixtures and combinations thereof.

4. The sound attenuating cover of claim 1, wherein said at least one layer of sound attenuating material is chosen from the group consisting of vinyl-based sheeting, vinyl-based foam, barium loaded vinyl, glass fiber sheeting, glass fiber matting, and mixtures and combinations thereof.

5. The sound attenuating cover of claim 1, wherein said at least one layer of sound attenuating material includes glass fiber matting; wherein the outer edges of each of said outer sleeve member and said circular top member are sealed by a process chosen from the group consisting of heat sealing, heat welding, stitching, gluing, embossing, and mixtures and combinations thereof; and wherein at least said circular top member has at least one hole formed in the inner cover sheeting material thereof so as to permit entrained air in said glass fiber matting to be expelled therefrom for purposes of packaging said sound attenuating cover, and so as to permit air to re-enter said glass fiber matting upon assembly of said sound attenuating cover for fitment to a compressor of a domestic air conditioner.

6. The sound attenuating cover of claim 1, wherein said closure member is chosen from the group consisting of a zipper, a bead and channel fastener, and a hook and loop fastener.

7. The sound attenuating cover of claim 1, further comprising an auxiliary extension sleeve for placement about the periphery of the compressor of a domestic air conditioner near the bottom age of said outer sleeve member.

8. A sound attenuating cover adapted for aerodynamically streamlined and intimate fitment to a compressor in the refrigeration condensor coil structure of a domestic air conditioner, which refrigeration condensor coil structure comprises an outer cooling coil shell forming a vertically orientated open area, a compressor assembly located at a bottom end of said open area and extending vertically upward into said opening, and a rotating fan at a top end of said open area to create an air flow within said structure in which air moves into said open area through said cooling coil shell, and moves vertically upwards past said compressor and through said fan, said cover, comprising: an outer sleeve member and a generally circular top member adapted to be releasably secured to said outer sleeve member by a closure member; hook and loop fasteners for securing a first end of said outer sleeve member to a portion of the outer periphery of said outer sleeve member near a second end thereof; whereby, when said closure member secures said top member to said outer sleeve member, and said hook and loop fasteners are secured, a cylindrical cover having a closed top end is formed having a diameter adapted for intimate fitment to a compressor of a domestic air conditioner; wherein the profile of said circular top member includes an inwardly and upwardly directed tapered side from said closure member, so as to provide an exterior truncated conical configuration thereof, and wherein each of said outer sleeve member and said circular top member comprises an inner cover sheeting material and an outer cover sheeting material, and at least one layer of sound attenuating material therebetween, and wherein at least part of said air flow enters said refrigeration condensor coil structure at the side of said compressor cover, and moves vertically upwards past said inwardly and upwardly directed tapered side of said closure member.

9. The sound attenuating cover of claim 8, wherein said outer sleeve member has cutout portions formed therein so as to accommodate electrical and refrigerant piping connections to a compressor when said sound attenuating cover is fitted thereover.

10. The sound attenuating cover of claim 8, wherein said inner and outer cover sheeting materials are each chosen from the group consisting of vinyl, PVC, heat resistant PVC, glass fiber sheeting, canvas, and mixtures and combinations thereof.

11. The sound attenuating cover of claim 8, wherein said at least one layer of sound attenuating material is chosen from the group consisting of vinyl-based sheeting, vinyl-based foam, barium loading vinyl, glass fiber sheeting, glass fiber matting, and mixtures and combinations thereof.

12. The sound attenuating cover of claim 8, wherein said at least one layer of sound attenuating material includes glass fiber matting; wherein the outer edges of each of said outer sleeve member and said circular top member are sealed by a process chosen from the group consisting of heat sealing, heat welding, stitching, gluing, embossing, and mixtures and combinations thereof; and wherein at least said circular top member has at least one hole formed in the inner cover sheeting material thereof so as to permit entrained air in said glass fiber matting to be expelled therefrom for purposes of packaging said sound attenuating cover, and so as to permit air to re-enter said glass fiber matting upon assembly of said sound attenuating cover for fitment to a compressor of a domestic air conditioner.

13. The sound attenuating cover of claim 8, wherein said closure member is chosen from the group consisting of a zipper, a bead and channel fastener, and a hook and loop fastener.

14. The sound attenuating cover of claim 8, further comprising an auxiliary extension sleeve for placement about the periphery of the compressor of a domestic air conditioner near the bottom age of said outer sleeve member.

* * * * *